Figure 1:
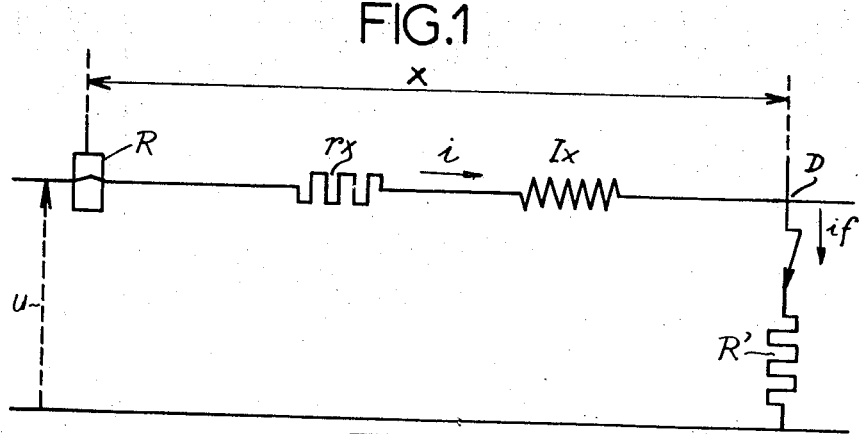

United States Patent

[11] 3,612,989

[72] Inventors Michel Henry Pierre Souillard
Fontenay-aux-Roses;
Michel Louis Fonteny, Vert-le-Petit, both of
France
[21] Appl. No. 801,058
[22] Filed Feb. 20, 1969
[45] Patented Oct. 12, 1971
[73] Assignee Compagnie Des Compteurs
Paris, France
[32] Priority Feb. 27, 1968
[33] France
[31] 141,338

[54] ARRANGEMENT FOR ESTABLISHING THE
LOCATION OF PHASE-TO-PHASE OR PHASE-TO-
EARTH FAULTS ON A LOOP OF A POLYPHASE
ELECTRICAL POWERLINE UTILIZING ONLY
VOLTAGE AND CURRENT MAGNITUDES
AVAILABLE AT A MEASURING POINT ON THE
LOOP
5 Claims, 3 Drawing Figs.

[52] U.S. Cl. .................................................. 324/52,
317/36 D
[51] Int. Cl. ..................................................... G01r 31/08

[50] Field of Search.......................................... 324/52;
317/36 D

[56] References Cited
UNITED STATES PATENTS
3,474,333  10/1969  Hoel.............................. 324/52

Primary Examiner—Gerard R. Strecker
Attorney—Pierce, Scheffler & Parker

ABSTRACT: A process for measuring the distance of a fault between phases and the earth of an electric power transport line where one effects, at the moment when the faulty current takes a zero value, the ratio between the voltage of the faulty loop at the measuring point and a reference voltage representing the voltage drop equivalent to a faulty current in a given length of the loop in question. A device for measuring the distance of a fault between phases or the earth comprising means for elaborating a reference voltage representing a voltage drop equivalent to a faulty current in a given length of the faulty loop at the measuring point means for detecting the moment when the faulty current passes by a zero value, means for remembering the value at this moment of the voltage of said loop and the reference voltage, and means for effecting the ratio of these two voltages.

ARRANGEMENT FOR ESTABLISHING THE LOCATION OF PHASE-TO-PHASE OR PHASE-TO-EARTH FAULTS ON A LOOP OF A POLYPHASE ELECTRICAL POWERLINE UTILIZING ONLY VOLTAGE AND CURRENT MAGNITUDES AVAILABLE AT A MEASURING POINT ON THE LOOP

The present invention has the object of a process for localizing faults that may occur either between phases, or between phase and earth, on a polyphased electric power transport line, or in other words, a process by means of which the distance of faults is measured in relation to one of the ends of the line, for instance, from a transformation station or a junction station or an interconnection station.

The object of the invention is especially the utilizing of the magnitudes of electric currents and voltages available at the measuring point before detecting and eliminating the fault, with a view to enabling an exact measurement to be made independently of the frequency and shape of the wave of these electric magnitudes in the presence of a transistory aperiodic component of the fault current and, lastly, to eliminate localizing errors due to the eventual presence of a fault resistance, that is to say, when the fault is not clear.

The invention relates to a measuring process giving the distance of a fault between two or more phases or between a phase and earth, characterized in that one effects, at the moment when the fault current assumes a zero value, the ratio between the voltage of the faulty loop at the measuring point and a reference voltage representing the voltage drop equivalent to that set up by the fault current in a given length of the loop in question, said reference tension being elaborated by means of an assembly of image impedances of the faulty loop.

According to one characteristic of the invention, in the case of a fault between phases, the moment when the fault current takes on a zero value is considered as being the moment of passing to zero of the line current in the loop in fault at the measuring point.

According to another characteristic of the invention, in the case of a defect between phase and earth, the moment when the faulty current assumes a zero value is the same as the moment of passing to zero of the zero-phase sequence component of the line currents at the measuring point.

Other characteristics of the invention will be revealed by the description which follows, as well as the drawings attached by way of embodiment examples without restrictive character.

FIG. 1 shows the monophased equivalent diagram of an electric power transport line at the moment of an earth fault.

Figure 2:
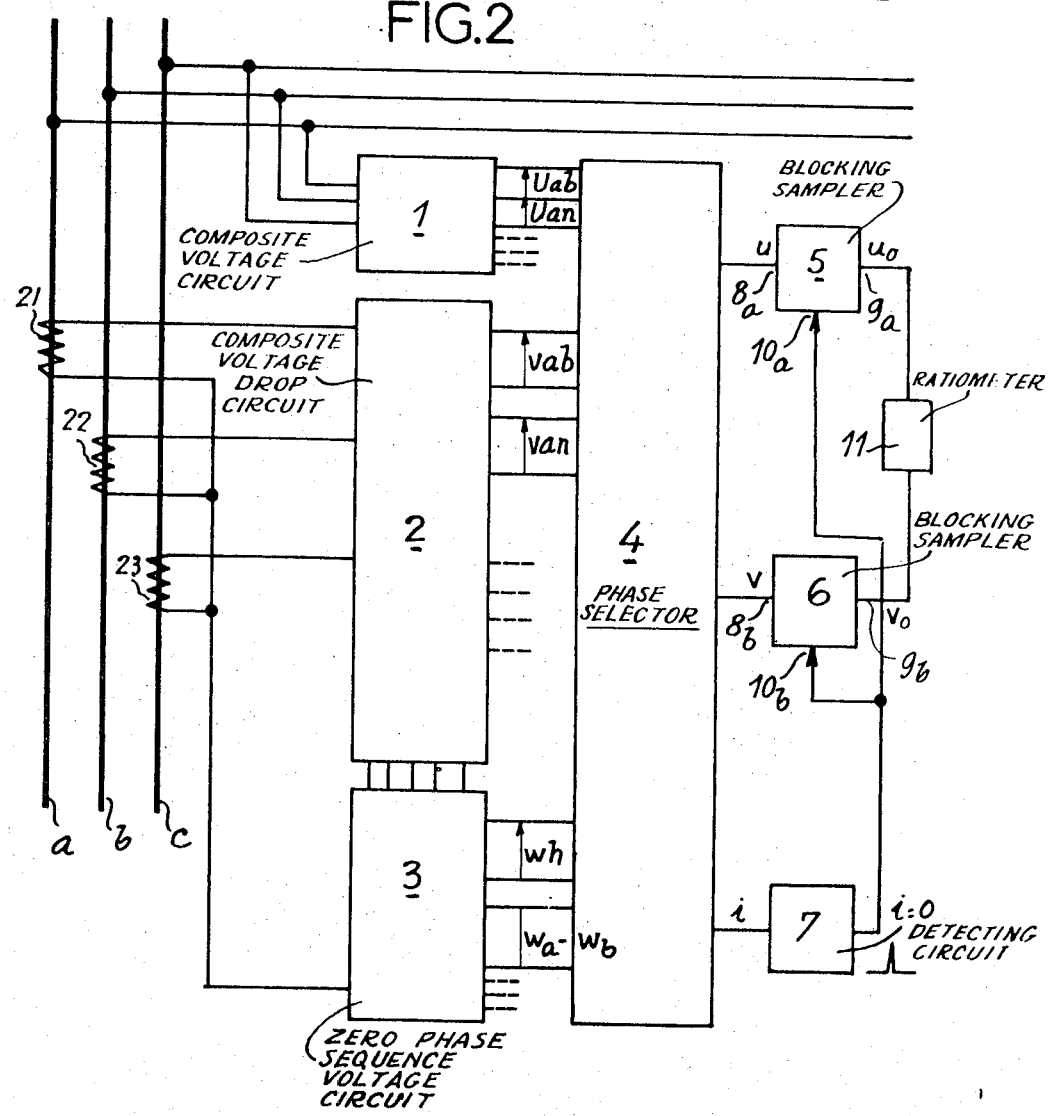

FIG. 2 gives the diagram for a triphased network of a device putting the process of the invention into operation.

Figure 3:
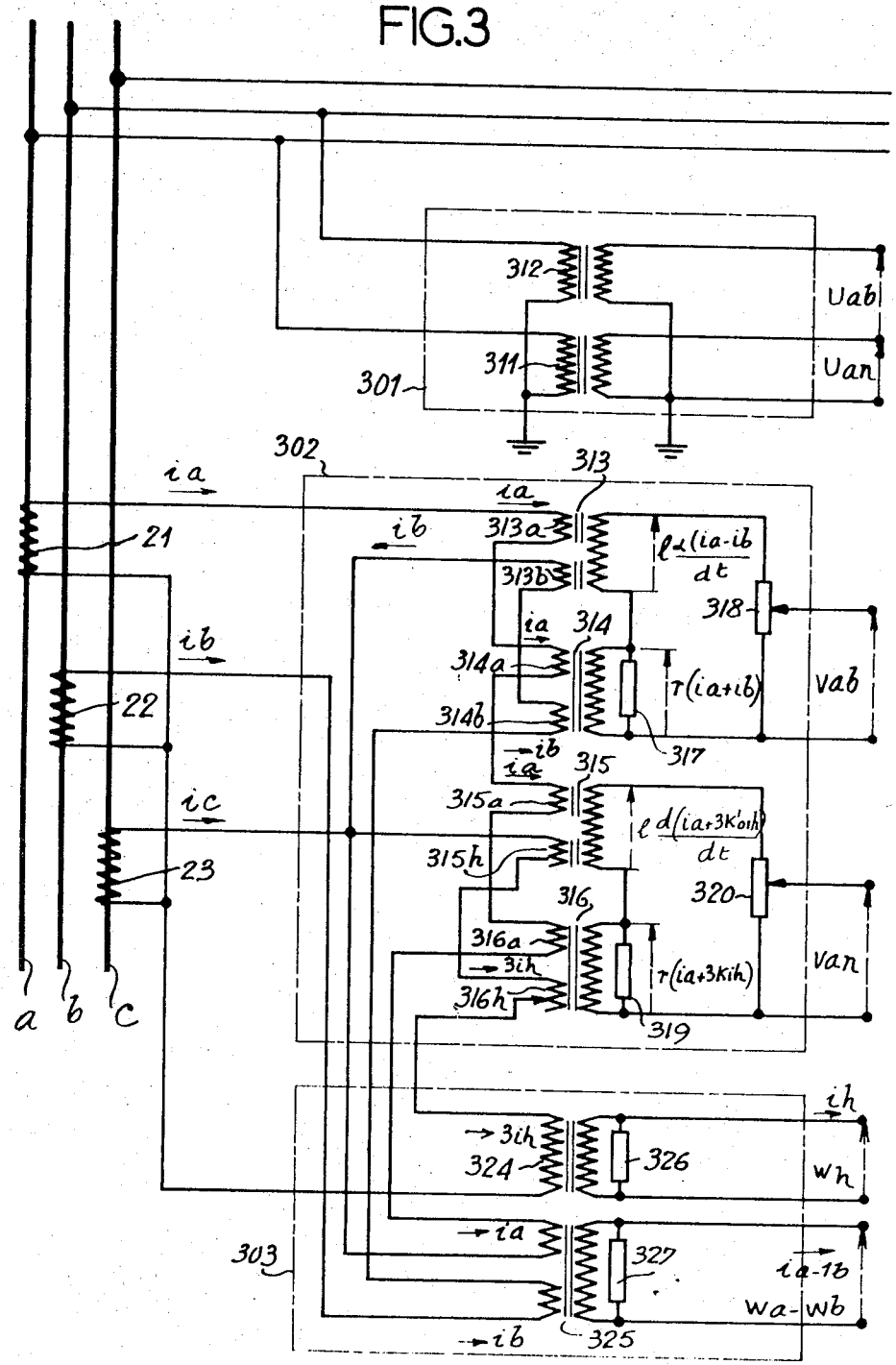

FIG. 3 shows the detailed electric diagram of some elements of FIG. 1.

In the general case and for the electric transport line shown in FIG. 1, it is possible to define, at the moment of the earth fault shown by a resistance $R'$, a voltage $u$ and a current $i$ whose instantaneous values at the measuring point or relay R are linked by the relation:

$$u = xri + xl(di/dt) + R'i_f \quad (1)$$

in which:
- $r$ = resistance of the line by length unit,
- $l$ = inductance of the line by length unit,
- $R'$ = resistance of the fault,
- $i_f$ = real current intensity in the fault
- $x$ = distance between the fault D and the measuring point or measuring relay R.

If we use a reference impedance showing a line length $y$, we can obtain, by causing this impedance to be traversed by the same current $i$, a voltage $v$ such as: $v = yri + yldi/dt \quad (2)$ At the moment when the current $i_f$ in the fault assumes a zero value, we may put down by giving the index $o$ to the values $u,v,i$ and $di/dt$ at this moment:

$$u_o = xri_o + xl(di/dt)_o = (x/y)v_o \quad (3)$$

hence $x = y \cdot (u_o/v_o) \quad (4)$

The distance at which the fault occurs is thus proportional to the ratio between the voltage of the loop that is faulty and a reference voltage showing the voltage drop in a given length of loop, being a ratio considered at moments when the current intensity in the fault passes through a zero value.

The process according to the invention enables errors to be eliminated due to the fault resistance and make a correct measurement no matter what the wave shape of the current or voltage magnitudes, independently, in particular, of the existence at the moment of the fault and the amplitude of a transitory aperiodic component.

But as the relay point R, or measuring point, we do not generally know the current in the fault, unless the line supervised is in antenna, that is to say, fed from one end, in which case the line current passes through zero at the same time as the fault current.

In the case of a supply from both ends, which is the case for interconnected networks, we must distinguish the case of a resisting fault to the earth and the case of a resisting fault between two phases.

In the case of a resisting fault between two phases, we can determine in a sufficiently accurate manner the position of the fault by ascertaining the ratio of the voltage between phases of the faulty loop and the reference voltage at moments when the current in this loop passes to zero. The presence of a fault resistance does not entail an important localizing error for at the moments when the line current passes by zero, the voltage at the terminals of the fault is very low; on the one hand, because in this type of fault between phases, the fault current having generally a very considerable amplitude in relation to the normal load current, the moments of passing to zero of the line current and the current in the fault are appreciably the same, on the other hand, because the value of the resistance of faults between phases that is only an arc resistance is generally low.

These two reasons concur so that, in the case of faults between phases, the term in $R'i_f$ has, at moments when the current $i$ passes by zero, a negligible value to that of the other terms of the equation (1).

On the other hand, in the case of an earth fault, the resistance of the fault is the sum of an arc resistance and the arcover resistance to earth shown, for instance, by the pylons. This total resistance may reach a high value that may, moreover, reduce the fault current in relation to the load current. The sum total of these considerations means that we should commit a serious mistake in deducing, in the same way as for a fault between two phases, the position of the earth fault from the value of the relation of the simple voltage of the faulty loop to a reference voltage when the line current passes by zero.

However, the current circulating in the resisting fault to the earth, that is to say, in the arcover resistance $R'$ is the sum of the zero-phase sequence currents circulating in the parts of the network situated on either side of the fault. In making the sole hypothesis practically always verified in very high voltage power transport networks, that the zero-phase sequence impedances of the parts of the network have the same argument, the zero-phase current in the line, and hence at the terminals of the relay R, is at all times proportional to the fault current and is thus cancelled out at the same times as said current.

We shall thus make an exact localization of earth faults, independent from the resistance of the fault, by ascertaining the relation of the simple voltage of the faulty phase to a reference voltage at moments when the zero-phase sequence current at the relay point passes by zero.

The localizing device not being intended to control a safety member as a function of the position of the fault, we can either separately measure said values $u_o$ and $v_o$ and subsequently carry out the quotient thereof, or automatically effect the quotient of the two voltages $u_o$ and $v_o$ by known ratiometrical methods, so as to be able directly to record on a deviation member appliance or on a numerical appliance, the distance at which the fault occurs.

The voltage $u$ of the faulty loop is thus:

the simple voltage relating to the faulty conductor, at the point where measurement takes place, in the event of an earth monophased fault, the voltage between phases, relative to two faulty conductors, at the point where measuring takes place, in the case of a fault between two phases, said fault being earthed or otherwise.

The reference voltage $v$ shows in all cases the voltage drop produced in a given line length $y$ shown by its equivalent diagram valid in the case of faults considered. Known formulas giving the values of these reference voltages are:

for a monophased fault between the phase $a$ and earth:

$$v_{an} = yr(i_a + 3ki_h) + yl\frac{d(i_a + 3k'i_h)}{dt} \quad (5)$$

with $k=(r_h-r)/3r$ and $k'=(l_b-l)/3l$ as well as $i_h=\frac{1}{3}(i_a+i_b+i_c)$ formulas in which $r$ and $l$ on the one hand, $r_h$ and $l_h$ on the other hand, respectively, represent the direct and homopolary components of resistances and inductances per length unit, for a biphased fault between the phases $a$ and $b$:

$$v_{ab} = v_a - v_b = yr(i_a - i_b) + yl\frac{d(i_a - i_b)}{dt} \quad (6)$$

a formula where $r$ and $l$ have the same significance as previously.

The expressions of the reference voltages $v$ for monophased or biphased faults on other loops are deduced by the formulas (5) and (6) by a circular permutation of the phase indices $a, b, c$.

A device according to the process of the invention is shown in FIG. 2. In this figure, a device is considered mounted on a three-conductor three-phased line $a, b, c$. An element 1 described hereafter is branched in derivation on the phase wires $a, b, c$ and delivers, at its output, voltages $u_{ab}, u_{bc}, u_{ca}$ and $u_{an}, u_{bn}, u_{cn}$ relative to the line to be supervised. An element 2 also described hereafter, is connected to the secondary windings 21, 22, 23 of a star three-phased transformer whose middle point is connected to an element 3 described in that which follows and which also receives data from the element 2.

The element 2 delivers, at its output, voltages $v_{ab}, v_{bc}, v_{ca}$ and $v_{an}, v_{bn}, v_{cn}$ showing voltage drops produced in the given length or reference $y$ of the line. The element 3 delivers, at its output, voltages $w_h$ and $w_a-w_b, w_b-w_c, w_c-w_a$, voltages which are respectively proportional to $i_h$ and $i_a-i_b, i_b-i_c, i_c-i_a$.

The various respective outputs of the elements 1, 2, and 3 are connected to the phase selector and switching device 4, the type of which is well known in the art of protective relays, and which is described, for example, in A. R. Van C. Warrington—Protective Relays —Vol. 1, Second Ed. (1962)—Chapman and Hall—Chapter 6. The switching device 4 detects those line conductors which are in a fault condition and delivers at the output thereof the various voltages $u$ and $v$ as well as the intensity $i$ referred to in the foregoing, and this device 4 is connected, on the one hand, to blocking samplers 5 and 6, and on the other hand, to a circuit 7 detecting the passage to zero of the current $i$ connected to the blocking samplers for blocking thereof when the current $i$ passes through zero as explained in that which follows.

The blocking samplers 5 and 6 are known in themselves by numerous publications in technical literature. They comprise, for instance a measuring input and output respectively 8a, 8b and 9a, 9b as well as control gates, respectively 10a and 10b. In the absence of signal on the gates 10a and/or 10b and whatever the signal variations applied at the input, the output instantaneously and exactly follows the input signal. Furthermore, the measuring output retains this instantaneous value in identical conditions during an indefinite time after receiving a blocking signal on the control gate respectively 10a, 10b (such circuits are described by a publication in the McGraw Hill Book Co, entitled "Electronic analog and hybrid computers," par. 10-4).

The circuit 7 is used in connection with the blocking samplers and detects the passage to zero of the current $i$. This circuit has not been described in detail since it is well known to those in this art.

The circuit 7 pilots the blocking samplers 5 and 6 by providing a very short signal for starting and blocking them at the moment of the passage through zero of the current $i$ applied to the input of circuit 7.

The measuring input of the blocking sampler 5 is supplied by the voltage $u$ of the faulty loop (for instance, phases $a$ and $b$) taken at the terminals of the element or relay 1. The measuring input of the blocking sampler 6 is supplied by the reference voltage $v$. The blocking control is simultaneously applied to both samplers 5 and 6, when the current $i$, taken for piloting measurements, passes by zero in the element 7. In other words, the passing to zero of the current $i$ blocks said samplers 5 and 6.

The voltage of the faulty loop and the reference voltage $v$ are applied to the respective inputs 8a, 8b of the blocking samplers, respectively 5, 6 by means of the phase selecting device 4 detecting conductors affected by a fault.

We then collect, just after the passage to zero of the current and on the output, the blocked voltages and constant value, respectively $u_o$ and $v_o$ that can be either measured separately for subsequently ascertaining the quotient, or automatically computed for finding the quotient by a ratiometrical method, so as to determine the distance $x$ of the fault by the formula (4). A ratiometer 11 is connected at the output of the blocking samplers 5 and 6 and displays such as distance.

FIG. 3 shows an example of embodiments giving the equations mentioned above and allowing the voltage $u$ to be obtained of the faulty loop, the reference voltage $v$ and current $i$ taken for piloting measurements.

Thus, the voltage $v_{an}$ complies with the equation (5) and the voltage $v_{ab}$ with the equation (6).

In FIG. 3, we find the three phase lines $a, b, c$ as well as the elements 301, 302, 303 respectively corresponding to the elements 1, 2 and 3 of FIG. 2 and preceding the phase selection device 4.

The element 301 delivers voltages $u_{ab}$ and $u_{an}$ respectively between the phases $a$ and $b$ on the one hand, the phase $a$ and the earth, on the other hand, by means of transformers 311, 312 whose primaries are branched between the respective phases $a, b$ and the earth.

The element 302 delivers reference voltages $v_{ab}$ and $v_{an}$ proportional to the currents $i_a, i_b$ circulating in the faulty loop $ab$ and $i_a, i_h$ in the faulty loop formed between the phase $a$ and the earth.

The voltage $v_{ab}$ is obtained at the terminals of the secondary windings, connected in series, a mutual inductance 313 and an intensity transformer 314, said transformer having its secondary winding closed on a noninductive resistance 317. The mutual inductance 313 and the transformer of intensity 314 each have two primary windings, respectively 313a, 313b and 314a, 314b.

The windings 313a and 314a linked in series are connected to the secondary winding of the principal intensity transformer 21 whose primary is formed by the conductor of the phase $a$; the windings 313b and 314b are likewise branched in series with the secondary winding of the principal intensity transformer 22 of the phase $b$.

The direction of the windings 313a, 314a on the one hand, and 313b, 314b on the other hand, are provided so that the voltages collected at the terminals of the secondaries of the mutual inductance 313 and intensity transformer 314 are proportional to the current differences $i_a$ and $i_b$.

A potentiometer 318 branched onto the terminals of the secondaries of the mutual inductances 313 and 314 allows a voltage $v_{ab}$ to be collected that is adaptable to the length $y$ of the loop supervised.

In like manner, the voltage $v_{an}$ is obtained at the terminals of a potentiometer 320 supplied by the sum of the voltages taken at the terminals of the secondaries, on the one hand, of the mutual impedance 315, and, on the other, of the intensity transformer 316 delivering on a noninductive resistor 319.

The primary windings 315a and 316a are supplied in series by the current $i_a$ of the secondary circuit of the intensity transformer 21. The windings 315h and 316h are provided with plugs enabling the coefficients $k$ and $k'$ to be adjusted defined in the equation (5) and are supplied in series by the residual current $3i_h$, equal to the triple of the homopolary component of the line currents, and obtained by making the sum of the secondary currents of the principal intensity transformers 21, 22, and 23 of the phases $a$, $b$, and $c$.

The directions of the primary windings of the mutual inductance 315 and intensity transformers 316 are such that the voltages delivered to their respective secondaries are proportional to the sum of the primary currents.

Lastly, the element 303 comprises intensity transformers 324 and 325 delivering on noninductive resistors 326 and 327.

The primary of the transformer 324 is traversed by the residual current $3i_h$ and a voltage $w_h$ is collected at the terminals of the resistance 326 which voltage is proportional to the current $i_h$.

The primaries of the transformer 325 with two windings are respectively traversed by the currents $i_a$ and $i_b$ in a direction so that a voltage $w_a-w_b$ is collected on the resistor 327 proportional to the difference of the currents $i_a$ and $i_b$.

These voltages $w_h$ and $w_a-w_b$ are applied, as shown in FIG. 2, to the pilotage of the detector 7 by means of the phase selecting device 4.

Thus, at any moment, in the case of a fault between phases, for instance, phases $a$ and $b$, voltages $u_{ab}=u_a-u_b$, $v_{ab}=v_a-v_b$ and $w_{ab}=w_a-w_b$ are available, in the case of a fault between a phase ($a$ for instance) and the earth, we have $u_{an}$, $v_{an}$ and $w_h$ voltages available.

We claim:

1. The process for locating phase-to-phase and phase-to-earth short circuit faults on a polyphase electrical powerline by measuring only the magnitudes of currents and voltages available at a measuring point which composes the steps of
   a. detecting the moment when the short circuit current takes a zero datum,
   b. measuring at said moment a first voltage drop on the line at the measuring point,
   c. deriving also at said moment a reference voltage drop equivalent to the short circuit current at the measuring point in a given image-impedance representing a given length of the line, and
   d. computing the ratio between said first voltage drop and said reference voltage, whereby the distance at which the short circuit fault has occurred will be proportional to said ratio.

2. The process as defined in claim 1 wherein for locating phase-to-phase faults and for detecting the moment when the short circuit current takes a zero datum, the moment at which the line current becomes null is detected at the measuring point.

3. A process as defined in claim 1 wherein for locating phase-to-earth faults and for detecting the moment when the short circuit current takes a zero datum, the moment at which the zero-phase sequence component of the line currents becomes null is detected at the measuring point.

4. A device for locating phase-to-phase and phase-to-earth short circuit faults on a polyphase electrical powerline in which only the magnitudes of the currents and voltages available at a measuring point are utilized which comprises:
   a. means for deriving a voltage representing the magnitude of the voltage of said line at said measuring point,
   b. means for deriving a reference voltage representing a voltage drop equivalent to a short circuit current in a given image-impedance representing a given length of the line at said measuring point,
   c. means for detecting the moment when the short circuit passes by a zero datum,
   d. memory means connected to the means deriving the magnitude of the voltage of said line and to said reference voltage for keeping in memory said two voltages at the moment when said short circuit current passes through said zero datum, and
   e. means for displaying the ratio of said voltages.

5. A device for locating phase-to-phase and phase-to-earth short circuit faults on a polyphase electrical powerline in which only the magnitudes of the currents and voltages available at a measuring point are utilized which comprises:
   a. a first transformer having as many primary and secondary windings as there are phase conductors, the primary windings of said first transformer being connected respectively to said phase conductors,
   b. a second transformer respectively connected to said phase conductors, said second transformer having its secondary windings connected to image-impedance windings characteristic of a fault between phases in a given length of the line and to image-impedance windings characteristic of faults between a phase and earth in a given length of the line,
   c. a device for detecting nullity in the phase current and eventual zero-phase sequence currents,
   d. two blocking sampling circuits connected both to said device for detecting nullity in the phase current and eventual zero phase sequence currents and respectively to said image-impedance windings and to the secondary windings of said first transformer whereby both the voltages from said line and a reference voltage from said image-impedance windings may be kept in memory when said nullity in the current is detected,
   e. means for treating the data coming from said blocking sampling circuits whereby the ratio of said two voltages corresponds to the position of a fault on said line.

UNITED STATES PATENT OFFICE
CERTIFICATE OF CORRECTION

Patent No. 3,612,989      Dated October 12, 1971

Inventor(s) Michel Henry Pierre Souillard and Michel Louis Fonter

It is certified that error appears in the above-identified patent and that said Letters Patent are hereby corrected as shown below:

Claim 1, line 4, "composes" should be -- comprises --

Claim 4, line 11, "current" should be inserted after "circuit"

Signed and sealed this 21st day of March 1972.

(SEAL)
Attest:

EDWARD M. FLETCHER, JR.
Attesting Officer

ROBERT GOTTSCHALK
Commissioner of Patents